United States Patent [19]

Leger et al.

[11] Patent Number: 5,213,905
[45] Date of Patent: May 25, 1993

[54] PROCESS FOR PRODUCING A COMPOSITE FLAT PRODUCT, STAINLESS ARMOR AND ARMORED STORAGE TANK OBTAINED BY THIS PROCESS

[75] Inventors: Jacques Leger, St Julien sur Dheune; Rémi Roux; Gilbert Schweitzer, both of Le Creusot, all of France

[73] Assignee: Creusot-Loire Industrie, Puteaux, France

[21] Appl. No.: 841,500

[22] Filed: Feb. 26, 1992

[30] Foreign Application Priority Data

Mar. 1, 1991 [FR]  France ................. 9102496

[51] Int. Cl.$^5$ ..................... B32B 15/18; C21D 9/42
[52] U.S. Cl. ..................... 428/683; 428/685; 148/529; 89/36.02
[58] Field of Search ............. 428/683, 685; 148/529, 148/534; 89/36.02

[56] References Cited

U.S. PATENT DOCUMENTS

| | | | |
|---|---|---|---|
| 1,079,323 | 11/1913 | Benthall | 89/36.02 |
| 2,249,629 | 7/1941 | Hopkins | 428/683 |
| 2,438,759 | 3/1948 | Liebowitz | 29/189 |
| 2,874,082 | 2/1959 | Lena et al. | 148/31.5 |
| 3,516,878 | 6/1970 | Sandstrom et al. | 148/529 |
| 3,944,396 | 3/1970 | Chivinsky | 428/685 |
| 3,956,809 | 5/1976 | Chivinsky | 428/685 |
| 4,178,417 | 12/1979 | Oda et al. | 428/679 |
| 4,455,352 | 6/1984 | Ayres et al. | 148/529 |
| 4,917,969 | 4/1990 | Pircher et al. | 148/529 |

FOREIGN PATENT DOCUMENTS

| | | | |
|---|---|---|---|
| 2106939 | 5/1972 | France | 428/683 |
| 58-144421 | 8/1983 | Japan | 148/534 |
| 1-18502 | 1/1989 | Japan | 148/534 |
| 1-132716 | 5/1989 | Japan | 148/534 |
| 729263 | 4/1980 | U.S.S.R. | 148/529 |

*Primary Examiner*—John Zimmerman
*Attorney, Agent, or Firm*—Oblon, Spivak, McClelland, Maier & Neustadt

[57] ABSTRACT

Plating is carried out of a stainless steel sheet whose carbide redissolution temperature is lower than 1000° C. onto an armor steel sheet and the plated sheet obtained is quenched so that the Brinell hardness of the armor steel is between 250 and 700 BH. The plating may be carried out by corolling, explosion plating or explosion plating followed by rerolling. Tempering may be performed at a temperature between 200° and 600° C. on the plated and quenched sheet. The quenching is preferably carried out on an oil quenching machine under a press. The armors obtained comprise a stainless coating layer free from carbide precipitates at the grain boundaries. Storage tanks which resist projectiles and are employed for storing liquid corrosive products can be made from the stainless armors according to the invention.

9 Claims, No Drawings

PROCESS FOR PRODUCING A COMPOSITE FLAT PRODUCT, STAINLESS ARMOR AND ARMORED STORAGE TANK OBTAINED BY THIS PROCESS

BACKGROUND OF THE INVENTION

The invention relates to a process for producing a composite flat product forming a stainless armor and to an armor and to an armored storage tank obtained by this process.

At present, armors are produced from steel of very great hardness but are not intended to resist corrosion by corrosive products. When it is intended to produce armoured containers or storage tanks intended to contain corrosive fluids and having to withstand both projectiles and corrosion by the fluids contained, an armor steel is employed which is shaped by bending and mechanical welding and then the inside of the storage tank thus formed is coated with paint.

This technique has at least two disadvantages:

it is difficult to produce a homogeneous coating of paint inside a container and there is always the risk that some parts may be poorly protected, paints do not always resist well all the fluids which it is intended to store.

OBJECTS OF THE INVENTION

The aim of the invention is to propose a process which makes it possible to produce a composite flat product forming a stainless armour on at least one face and to produce containers exhibiting good resistance to impact by projectiles and good corrosion resistance all at the same time.

DESCRIPTION OF THE INVENTION

The subject of the invention is a process for producing a composite flat product forming a stainless armour, according to which the plating is carried out of a stainless steel sheet whose carbide redissolution temperature is lower than 1000° C., onto an armor steel sheet and the plated sheet obtained is quenched so that the Brinell hardness of the armor steel is between 250 and 700 BH.

The plating of the stainless steel sheet onto the armour steel sheet is preferably carried out by corolling, explosion plating or explosion plating followed by rerolling and the quenching is carried out using an oil quenching machine, under a press and followed by tempering at a temperature of between 200° and 600° C.

These armors can be advantageously produced by employing, as plating stainless material, a stainless steel of the 304LN or 316LN type (denomination according to the AISI standard) and corresponding to the following chemical analyses:

$$C \leq 0.03\%$$
$$0.2\% \leq Si \leq 1\%$$
$$Mn \leq 2\%$$
$$8\% \leq Ni \leq 15\%$$
$$15\% \leq Cr \leq 20\%$$
$$Mo \leq 2\%$$
$$N_2 \geq 0.1\%$$

the remainder being iron and impurities resulting from the melting of the raw materials.

The stainless steels employed are preferably of the 304L and 316L "low carbon" type containing less than 0.03% of carbon.

Also preferably these steels contain more than 0.1% of nitrogen.

The armor steel onto which the stainless material is plated contains:

| | |
|---|---|
| not more than | 0.6% of carbon |
| not more than | 2% of silicon |
| not more than | 5% of manganese |
| not more than | 5% of nickel |
| not more than | 2% of chromium |
| not more than | 1% of molybdenum |
| not more than | 1% of vanadium | the remainder being iron and impurities resulting from the melting of the raw materials.

The armour steel employed according to the process forming the subject of the invention makes it possible to obtain armours whose Brinell hardness is between 250 BH and 700 BH; these armours are quite flat and have an excellent resistance to penetration by a projectile and good corrosion resistance on one face.

Finally, the invention relates to storage tanks produced with the aid of the armors which are the subject of the invention; these storage tanks having an excellent resistance to penetration by a projectile and being capable of containing corrosive fluids without being corroded.

DETAILED DESCRIPTION OF THE INVENTION

The invention will now be described in greater detail.

To produce the armored and corrosion-resistant containers it is necessary to have available a material combining good ballistic properties (resistance to penetration by a projectile) and a good corrosion resistance. Such a material does not exist. On the other hand, it is possible to envisage, and this is the concept which forms the basis of the invention, having a composite material, in the form of plates or metal sheets, one of whose faces has ballistic properties and the other face a good corrosion resistance.

According to the invention such a material is obtained by the well-known technique of plating a suitably chosen stainless steel or alloy onto an armor material such as an armor steel.

This plating is carried out in a known manner either by explosion or by explosion and rerolling or by corolling.

The difficulty stems from the fact that there must be compatibility between the materials and more particularly compatibility between the heat treatments to which the two materials must be subjected so that each can exhibit the desired use characteristics.

The armour steel must have a very great hardness and a good ductility. The hardness sought after lies in the Brinell hardness range 250 BH to 700 BH. Such a hardness can be obtained only with a steel which has a sufficiently high content of carbon and of alloying elements and which has been subjected to quenching from a temperature which is not too high, to avoid coarsening the grain too much and deteriorating the ductility too much; this quench treatment may be followed by tempering at between 200° C. and 600° C.

To exhibit good corrosion resistance, the stainless steel must not have any fine carbide precipitations at the grain boundaries. To avoid this precipitation, this steel must be subjected, in a known manner, to an over-quenching treatment which consists of reheating to a temperature such that all the carbides are dissolved and the steel is then quickly cooled; this dissolution temperature is generally very high.

There is therefore a first condition for compatibility, which is that the carbide dissolution temperature of the stainless steel should not be too high, to make it possible simultaneously to carry out the overquenching treatment of the stainless steel and the quenching treatment of the armor steel. For this, it has been found that it is sufficient for the carbide dissolution temperature of the stainless steel to be lower than 1000° C.

This condition leads to the use of steels of the 304LN or 316LN type (according to the AISI standard). These are steels whose chemical composition is characterised by the following inequalities:

| |
|---|
| $C \leq 0.03\%$ |
| $0.2\% \leq Si \leq 1\%$ |
| $Mn \leq 2\%$ |
| $8\% \leq Ni \leq 15\%$ |
| $15\% \leq Cr \leq 20\%$ |
| $Mo \leq 2\%$ |
| $N_2 \geq 0.1\%$ | the remainder being iron and impurities resulting from the melting of the raw materials.

The armour steel, for its part, is a steel which, after quenching and optionally tempering between 200° C. and 600° C., makes it possible to obtain hardnesses of between 250 BH and 700 BH.

Its chemical composition is characterised in that it comprises a high carbon content to obtain a very great hardness but not more than 0.6% of this element. It also comprises:

| |
|---|
| not more than 0.2% of silicon |
| not more than 5% of manganese |
| not more than 5% of nickel |
| not more than 2% of chromium |
| not more than 1% of molybdenum |
| not more than 1% of vanadium | all these elements being intended to increase the quenchability and to obtain a great hardness and a satisfactory ductility at the same time.

When a composite material such as that just described is quenched, the expansions or contractions of the two materials are not the same and the assembly behaves like a bimetallic strip.

To obtain good flatness of the plated sheet after quenching, this operation is preferably carried out in a quenching machine under a press which keeps the sheet quite flat during the quenching, and this limits the residual deformation to a camber of less than 6 mm/meter, whereas, using conventional quenching, the deformation corresponds to cambers greater than 10 mm/meter. Now, since the armor steel is very hard, it is very difficult to flatten a sheet which is thus deformed.

This quenching is carried out after reheating to a temperature below 1000° C. and preferably above 900° C. by immersing the sheet in oil.

With such reheating temperatures the carbides in the stainless steel are well dissolved and an excessive coarsening of the grain of the armor steel is avoided.

Compared with water quenching, oil quenching has the advantage of limiting the risks of cracks in the course of quenching.

The compatibility of the heat treatments is the main factor to be taken into account.

However, diffusion of carbon from the armour towards the stainless steel takes place at the interface between the stainless steel and the armor steel. This diffusion, which enriches the stainless steel in carbon in the neighbourhood of the junction region between the two metals may be detrimental to the quality of the bonding.

This is why low-carbon stainless steels which are characterised by a carbon content of less than 0.03% are employed.

Re-formation of carbide in the neighbourhood of the junction region is thus limited.

Lastly, and to avoid the formation of $\alpha$phase precipitates in the stainless steel, these precipitates being detrimental to its mechanical ductility characteristics and therefore to its formability, this stainless steel is stabilised by imposing a nitrogen content higher than or equal to 0.1%.

The stainless armors obtained by the process of the invention, which are in the form of a flat composite product, comprise a quenched base layer made of armor steel whose Brinell hardness is between 250 and 700 BH and a coating layer plated onto the base layer made of stainless steel free from carbide precipitates at the grain boundaries.

The stainless armors thus obtained and also forming a subject of the invention make it possible to manufacture storage tanks which are at the same time armoured and capable of containing corrosive fluids.

To produce these storage tanks an armor according to the invention is taken and a container is produced by bending and mechanical welding, its inner face being made of stainless steel and therefore resisting corrosion, and the outer face of armor steel and thus resisting the impact of projectiles.

This particular application does not in any way limit applications which may be envisaged for the stainless armor which is the subject of the invention.

We claim:

1. A process for producing a composite flat stainless armor comprising the steps of:
    plating onto an armor steel sheet a sheet of a stainless steel whose carbide redissolution temperature is lower than 1000° C.,
    heating the plated sheet to a temperature between 900° and 1000° C.,
    quenching the plated sheet from the heating temperature,
    the armor steel having, after quenching, a Brinell Hardness between 250 and 700 BH.

2. The process according to claim 1, wherein the plating of the stainless steel sheet onto the armor steel sheet is carried out by a process selected from the group consisting of corolling, explosion plating, and explosion plating followed by rerolling.

3. The process according to claim 1 or 2 further comprising tempering the quenched plated sheet at a temperature of between 200° and 600° C.

4. The process according to claim 1 or 2 wherein said quenching of the plated sheet is carried out by quenching in oil.

5. The process according to claim 4, wherein the oil quenching is carried out in an oil quenching machine under a press.

6. A stainless armor in the form of a composite flat product comprising a quenched base layer made of armor steel whose Brinell hardness is between 250 and 700 BH and a coating layer plated onto the base layer made of stainless steel free from carbide precipitates at the grain boundaries.

7. A stainless armor according to claim 6, wherein the stainless steel is a steel containing, in proportions by weight, $$C \leq 0.03\%$$
$$0.2\% \leq Si \leq 1\%$$
$$Mn \leq 2\%$$
$$8\% \leq Ni \leq 15\%$$
$$15\% \leq Cr \leq 20\%$$
$$Mo \leq 2\%$$
$$N_2 \geq 0.1\%$$

the remainder being iron and impurities resulting from the melting of the raw materials.

8. A stainless armor according to claim 6 or 7, wherein the armor steel contains, in proportions by weight,

| | |
|---|---|
| not more than | 0.6% of carbon |
| not more than | 2% of silicon |
| not more than | 5% of manganese |
| not more than | 5% of nickel |
| not more than | 2% of chromium |
| not more than | 1% of molybdenum |
| not more than | 1% of vanadium | the remainder being iron and impurities resulting from the melting of the raw materials.

9. An armored storage tank comprising a wall which resists penetration by a projectile and corrosion by corrosive products on its inner surface, having a wall produced by shaping and welding a composite flat product forming an armor and comprising a quenched base layer made of armor steel which has a Brinell hardness of between 250 BH and 700 BH and a coating layer plated onto the base layer of a stainless steel free from carbide precipitates at the grain boundaries.

* * * * *